(12) United States Patent
Liu et al.

(10) Patent No.: US 7,832,392 B2
(45) Date of Patent: Nov. 16, 2010

(54) SOLAR AIR CONDITIONING DEVICE

(75) Inventors: Tay-Jian Liu, Taipei Hsien (TW); Xin-Jian Xiao, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 405 days.

(21) Appl. No.: 11/961,238

(22) Filed: Dec. 20, 2007

(65) Prior Publication Data
US 2008/0289622 A1 Nov. 27, 2008

(30) Foreign Application Priority Data
May 25, 2007 (CN) .................... 2007 1 0074603

(51) Int. Cl.
*E04D 13/18* (2006.01)
*F24F 7/00* (2006.01)
(52) U.S. Cl. .................. 126/629; 126/570; 126/623; 126/651; 126/654; 159/903; 159/904; 165/48.1; 165/48.2
(58) Field of Classification Search ............... 126/628, 126/640, 666, 569; 52/426, 270
See application file for complete search history.

(56) References Cited

U.S. PATENT DOCUMENTS

| 5,145,287 | A | * | 9/1992 | Hooper et al. ............... 405/262 |
|---|---|---|---|---|
| 5,657,745 | A | * | 8/1997 | Damminger ................. 126/633 |
| 6,201,179 | B1 | * | 3/2001 | Dalacu ........................ 136/244 |
| 6,606,834 | B2 | * | 8/2003 | Martensson et al. ........... 52/578 |
| 6,694,692 | B2 | * | 2/2004 | Piccone ........................ 52/426 |
| 6,880,553 | B2 | * | 4/2005 | Liu et al. ..................... 126/628 |
| 7,509,775 | B2 | * | 3/2009 | Flaherty et al. ............. 52/173.3 |
| 2005/0241633 | A1 | * | 11/2005 | Nikiforov et al. ........... 126/628 |

* cited by examiner

*Primary Examiner*—Steven B McAllister
*Assistant Examiner*—Nikhil Mashruwala
(74) *Attorney, Agent, or Firm*—Jeffrey T. Knapp

(57) ABSTRACT

A solar air conditioning device (100) includes a solar collector assembly (30), an inlet assembly (10) at an entrance of the solar collector assembly, and an outlet assembly (50) at an exit of the solar collector assembly. The solar collector assembly includes a heat-absorbing set (31) and a transparent panel (38) being assembled to a top of the heat-absorbing set. The heat-absorbing set comprises a plurality of heat-absorbing units (32) engaged with each other. Each of the heat-absorbing units includes two adjacent supporting members (33) and a heat-absorbing plate (35) sandwiched between and buckled with the two supporting members. The heat-absorbing set defines an air channel (314) with the transparent panel and a heat-absorbing channel (315) below the air channel. The inlet and outlet assemblies are in fluidic communication with the heat-absorbing channel.

14 Claims, 22 Drawing Sheets

B-B

SOLAR AIR CONDITIONING DEVICE

CROSS-REFERENCES TO RELATED APPLICATION

This application is related to U.S. patent application Ser. No. 11/776,906 filed on Jul. 26, 2007 and entitled "SOLAR AIR CONDITIONING DEVICE"; the co-pending U.S. patent application is assigned to the same assignee as the instant application. The disclosure of the above-identified application is incorporated herein by reference.

BACKGROUND OF THE INVENTION

1. Field of the Invention

The present invention relates to air conditioning devices, and particularly, to an air conditioning device using solar energy to heat air.

2. Description of Related Art

With increasing $CO_2$ emissions, the risk of global climate becomes abnormal and ecological destruction may increase. As a result, industrialized countries have again become aware of the urgency to reduce their dependence on fossil fuels after the energy crisis in the 70's. Therefore, it has become important to develop new environmental friendly energy resources, and to replace devices using non-renewable energy resources, such as air-conditioners, with devices using renewable energy. The conventional air conditioning devices not only need more energy, but also require refrigerant which can be harmful to the environment. Consequently, these countries have given positive commitments to use solar energy more effectively. Though people still have reservations about whether solar energy will be able to replace other energy resources in the near future, one thing that is almost certain is that solar energy will be playing a very important role in a number of fields, especially air ventilation and heating in structures such as buildings and vehicles.

As far as an air conditioning device using solar energy for heating and air ventilation is concerned, solar collectors are a key part in such a device, and it has to be mounted at an outside location where sufficient sunlight can be collected, such as on a roof or wall. In the past, a lot of effort has been made to develop solar collectors with different functions and styles. Many of them have been disclosed in patent literature. The most typical example is fixing a glass panel or transparent panel onto a fixed outer frame of a heat-insulated chamber and passing fluid through black heat-absorbing plates or pipes installed inside the chamber, so as to absorb solar energy. Examples include the solar hot water supply system disclosed in U.S. Pat. No. 4,418,685, the air ventilation facility disclosed in WO 9,625,632, the roof-style air ventilation facility disclosed in US No. 2002/0,032,000A1, and the wall-style air preheater disclosed in U.S. Pat. No. 4,934,338. However, the solar collectors used presently still have some drawbacks. Therefore, there is much room for improvements in applying and promoting the usage of solar energy to save energy and facilitate air conditioning. The aforementioned drawbacks include:

(1) The related solar collector is too heavy. Its long-term use may cause an overly heavy load on the bearing structure.
(2) Solar-thermo conversion efficiency may be limited.
(3) The structure of the related solar collector is complicated, which makes its installation and maintenance difficult. And thus prolongs the return period.
(4) The related solar heating device has poor compatibility and flexibility to match different bearing structures. Very often, it has to be custom-made.
(5) The contour of the solar collector is obtrusive and often impairs the aesthete and harmony of the overall appearance of the bearing structure.
(6) The packaging needed for the collector takes up much space and increases the cost of storage, display, and marketing.
(7) The integral assembly of the whole-unit product is bulky, making it difficult to use in large-area application and increases installation cost.
(8) Glass or transparent panels are glazed onto the outer frame of a heat-insulated chamber. Different thermal expansion coefficients of materials may cause thermal stress problems.
(9) The related design is so complicated as to be difficult for an untrained user to install.
(10) Some of the related designs can only be applicable to the structures which are under construction and designed to allow its installation. For most existing structures, the designs are unsuitable.
(11) When air passes over a glazed panel, heat is dissipated unless double-glazing is used, but it is expensive and troublesome.
(12) Hot water supply systems or liquid systems operated by solar heating experience problems due to freezing and leakage of the working liquid.

Related solar air conditioning devices include that disclosed in U.S. Pat. No. 6,880,553. Heat-absorbing units of the solar air conditioning device of U.S. Pat. No. 6,880,553 are connected in a fixed way, however it is difficult to extend the area of the solar air conditioning device in a convenient way so that the solar air conditioning device can be used in different applications.

It is therefore desirable to provide a solar air conditioning device that can be flexibly extended and used in different applications.

SUMMARY OF THE INVENTION

A solar air conditioning device comprises a solar collector assembly, an inlet assembly installed at an entrance of the solar collector assembly, and an outlet assembly installed at an exit of the solar collector assembly. The solar collector assembly includes a heat-absorbing set and a transparent panel being assembled to a top of the heat-absorbing set. The heat-absorbing set comprises a plurality of heat-absorbing units. Each of the heat-absorbing units includes two adjacent supporting members and a heat-absorbing plate sandwiched between and buckled with the two supporting members. A pair of opposite connecting members are mounted at two outmost and opposite longitudinal sides of the heat-absorbing units. The connecting members engage with corresponding heat-absorbing plates of the heat-absorbing units. The heat-absorbing set defines an air channel with the transparent panel and a heat-absorbing channel below the air channel. The inlet and outlet assemblies are in fluidic communication with the heat-absorbing channel.

The heat-absorbing units can be assembled together in a flexible way via the supporting members and the heat-absorbing plates. Thus, the solar air conditioning assembly can be used in many different applications.

The solar air conditioning device can heat stale air guided from exhaust pipes connecting with a room requiring cooling and expel the hot stale air out of the structure by thermal buoyancy. Cool and fresh air outside can be guided to the room requiring cooling, or air from outside can be cooled and guided into the room requiring cooling. Thus, the solar air conditioning device can be used as an air conditioning system.

According to concept of a modular design, the solar air conditioning assembly provides users with a boarder range of applications. Moreover, the solar air conditioning assembly provides users with more selection and freedom in assembly. The solar air conditioning assembly can be installed horizontally or vertically attached to walls. Furthermore, it can be installed obliquely. The solar air conditioning assembly can also provide excellent heat insulation and protection to structures.

The heat-absorbing units used in the solar air conditioning assembly can be flexibly expanded as desired to the most optimal absorption surface areas to fully absorb and collect energy. Therefore, the solar air conditioning assembly does not need a fixed outer frame insulation chamber like the one used in the related solar air conditioning assembly. The solar air conditioning assembly also needs no special consideration for the heat efficiency of each individual unit, as related models do.

The solar air conditioning assembly only need one layer of transparent panel; because most of the air goes through the lower heat-absorbing channels, the assembly has the excellent insulation effect of a double-glazed system and a very high heat-absorption efficiency.

The solar air conditioning assembly is designed according to a modular concept. Cost of the solar air conditioning assembly is greatly reduced as the heat-absorbing units are made of thin boards and plates. The solar air conditioning assembly is much simpler than the related assemblies with a one piece unit design. The assembly not only reduces cost in packaging but also requires less room for display and storage thus making marketing much easier. The solar air conditioning assembly is very easy to install and maintain, so users can install or assemble the system by themselves.

The solar air conditioning assembly is operated and powered by solar energy and therefore does not rely on an electrical power source and does not need a refrigerant. Furthermore, the solar air conditioning assembly having modular heat-absorbing units can be increased in size to fit different conditions and function requirements.

Other advantages and novel features of the present invention will become more apparent from the following detailed description of preferred embodiment when taken in conjunction with the accompanying drawings.

BRIEF DESCRIPTION OF THE DRAWINGS

Many aspects of the present device can be better understood with reference to the following drawings. The components in the drawings are not necessarily drawn to scale, the emphasis instead being placed upon clearly illustrating the principles of the present device. Moreover, in the drawings, like reference numerals designate corresponding parts throughout the several views.

DETAILED DESCRIPTION OF THE INVENTION

Figure 1:
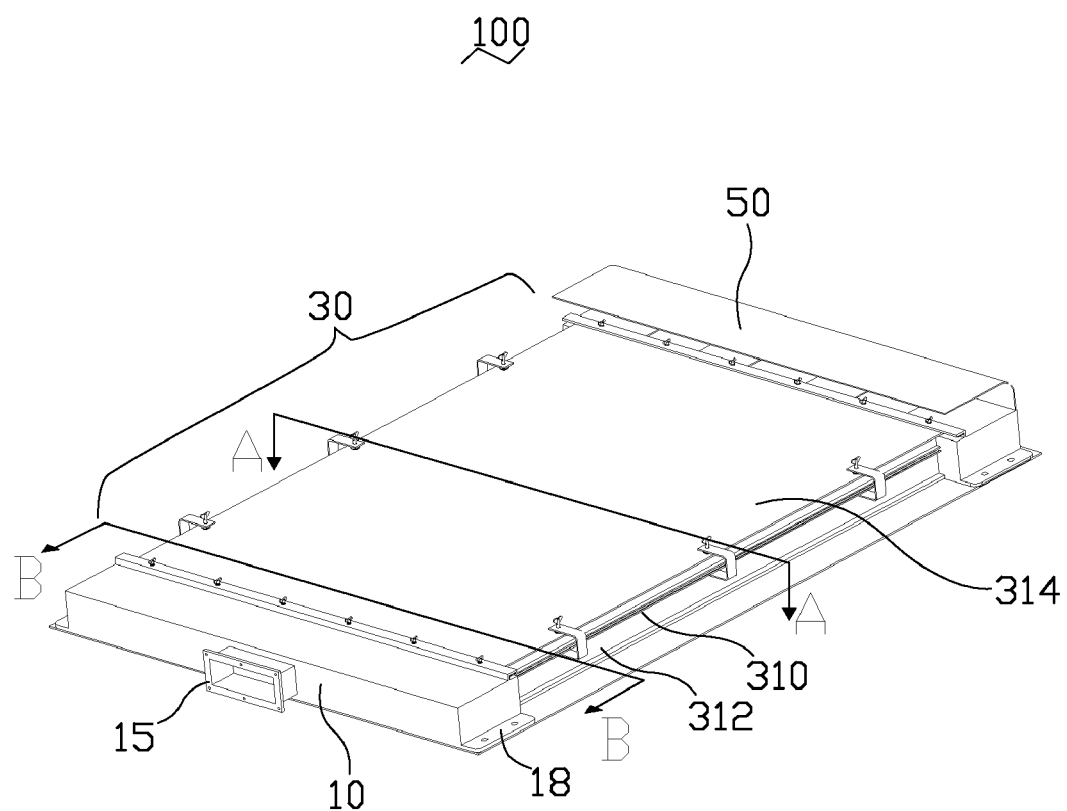
FIG. 1 is an assembled, schematic view of a solar air conditioning device in accordance with the preferred embodiment of the present invention.
Figure 2:
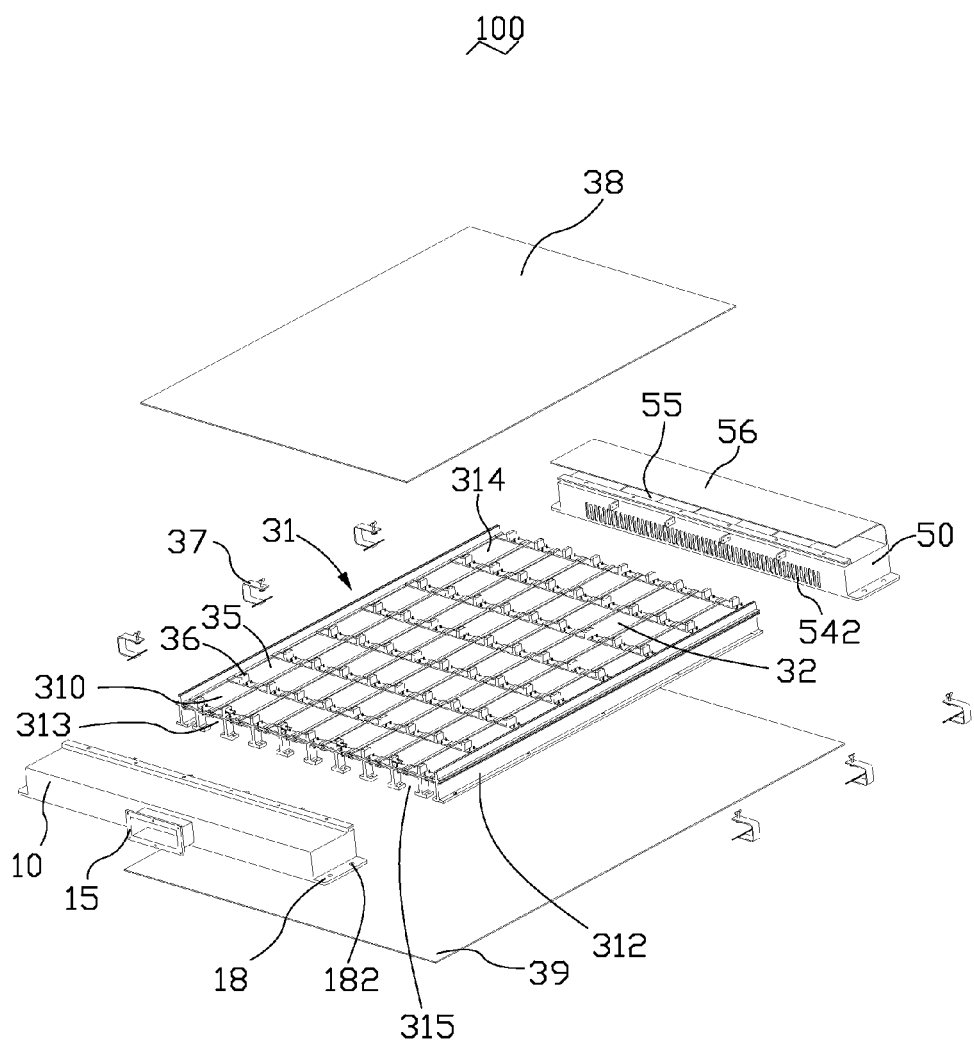
FIG. 2 is an exploded, schematic view of the solar air conditioning device in FIG. 1.

Referring to FIG. 1 and FIG. 2, a solar air conditioning device 100 in accordance with the present invention is shown. The air conditioning device 100 comprises a solar collector assembly 30, an inlet assembly 10, and an outlet assembly 50. The solar collector assembly 30 comprises a heat-absorbing set 31, a transparent panel 38 located above the heat-absorbing set 31, and a bottom plate 39 located below the heat-absorbing set 31. The heat-absorbing set 31 is used for absorbing solar energy to heat air through heat-absorbing channels 315 defined between the heat-absorbing set 31 and the bottom plate 39. The heat-absorbing set 31 comprises a plurality of modular heat-absorbing units 32 and a pair of connecting members 312 mounted at two outmost opposite longitudinal sides of the heat-absorbing units 32. The heat-absorbing units 32 are connected with each other in longitudinal and transverse directions. The heat-absorbing units 32 are made of good thermal conductivity materials with black surface. The heat-absorbing units 32 are manufactured by aluminum extrusion. Then they are subjected to surface treatment of anode oxidation and black coloring. The solar collector assembly 30 defines a plurality of upper heat-retention cavities 310 and a plurality of lower heat-absorbing cavities 313 by the heat-absorbing units 32 and the transparent panel 38. A plurality of air channel 314 is defined in the upper heat-retention cavities 310 and between the transparent panel 38 and the heat-absorbing set 31. The heat-absorbing channels 315 are defined in the lower heat-absorbing cavities 313.

Figure 3:
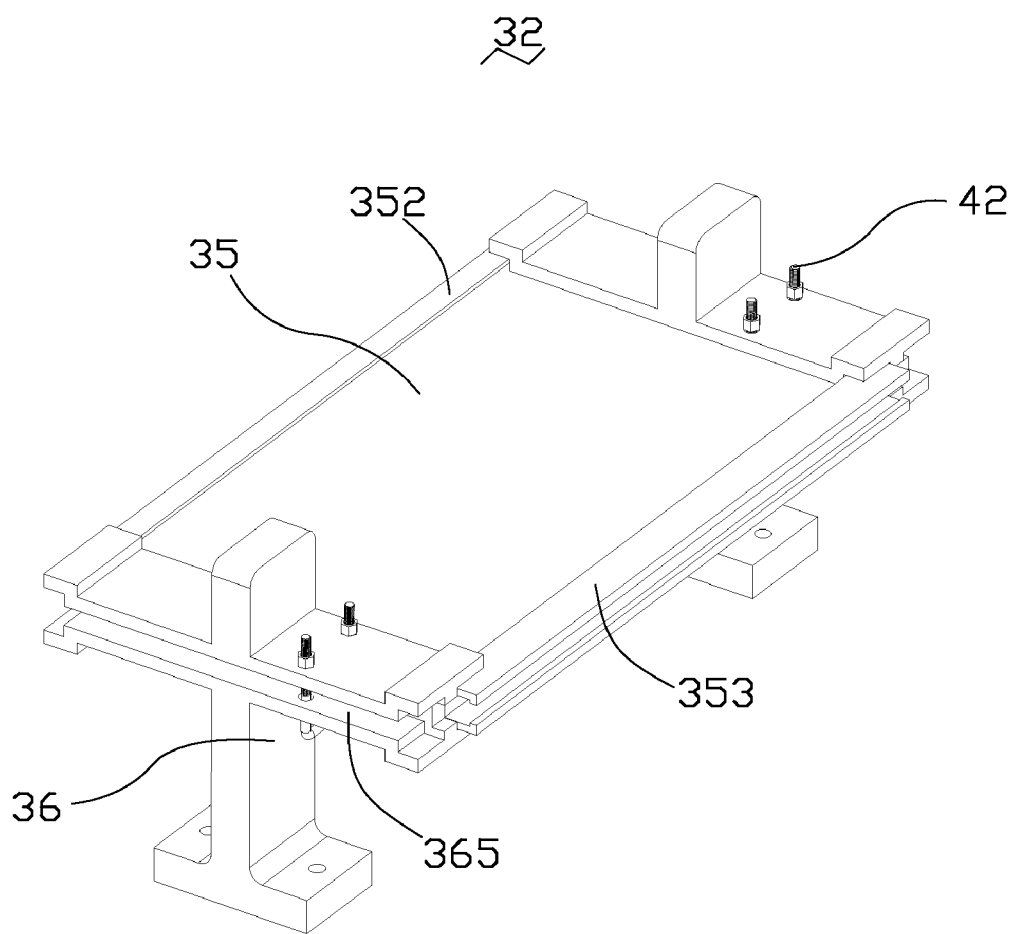
FIG. 3 is a schematic view of a heat-absorbing unit used in the air conditioning device in FIG. 1.
Figure 3A:
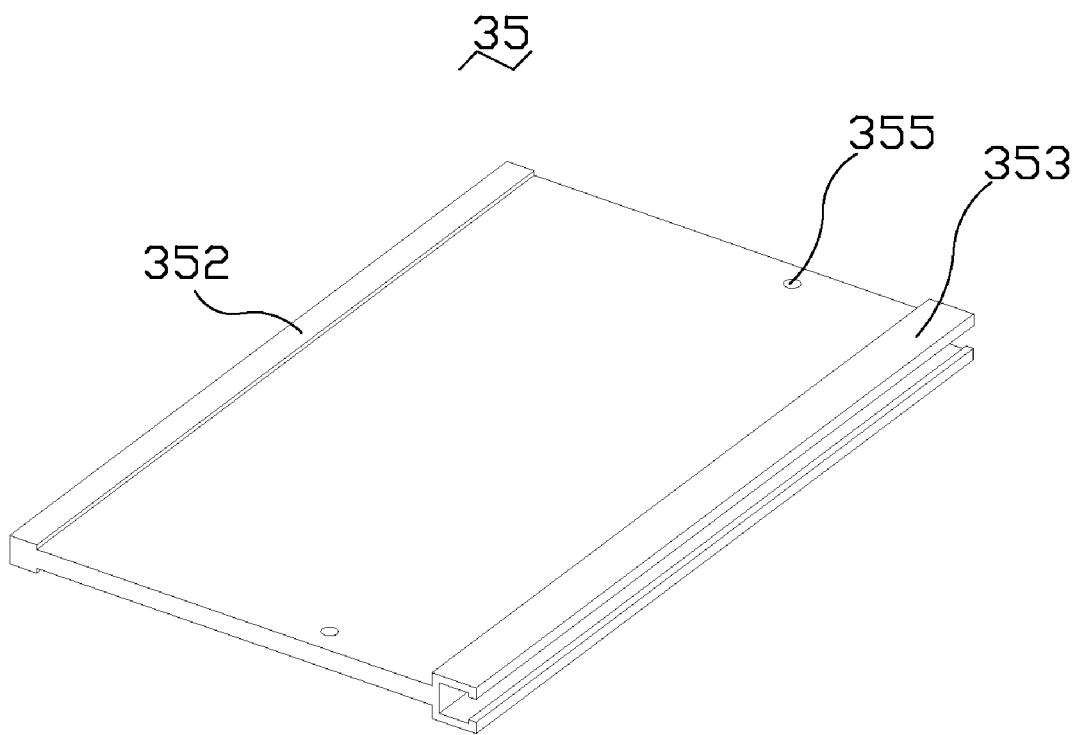
FIG. 3(A) is a schematic view of a heat-absorbing plate in FIG. 3.
Figure 3B:
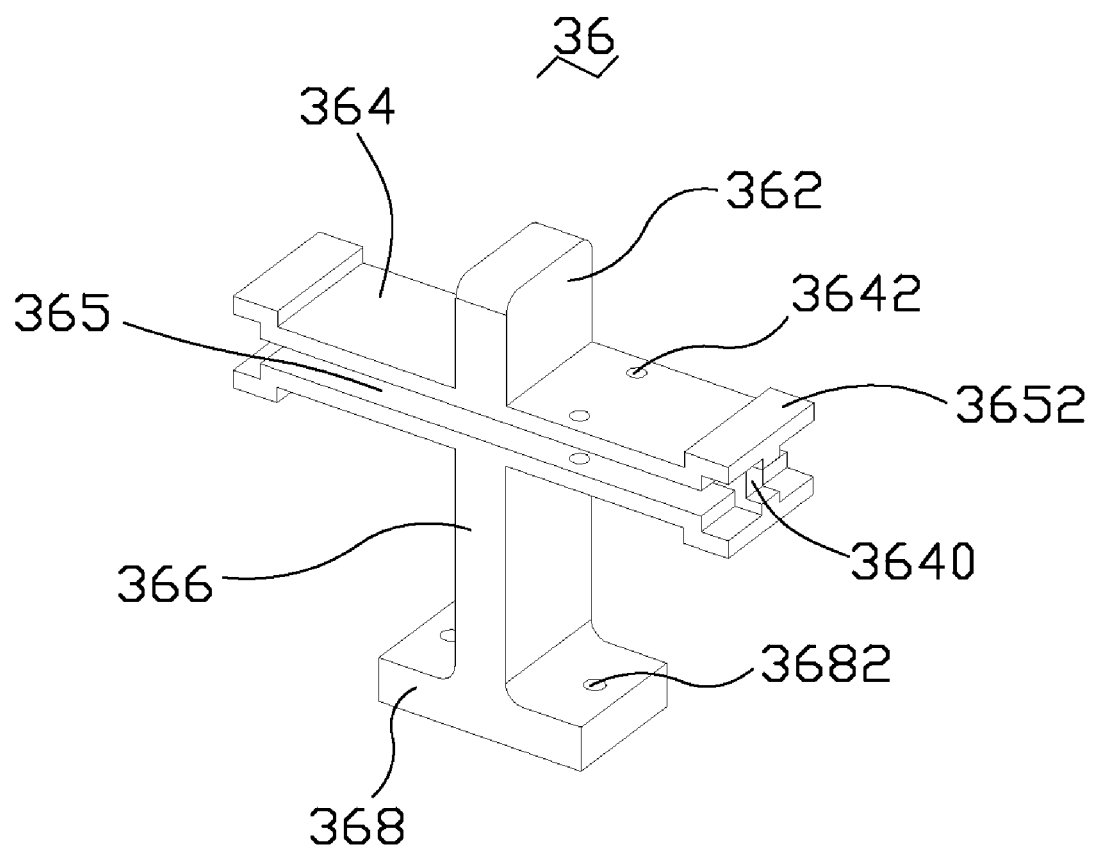
FIG. 3(B) is a schematic view of a supporting member of FIG. 3.

Referring to FIG. 3, a heat-absorbing unit 32 of the air conditioning device 100 is shown. The heat-absorbing unit 32 comprises a pair of supporting members 36 and a heat-absorbing plate 35 connecting the supporting members 36 together. Referring to FIG. 3(A), a heat-absorbing plate 35 of the heat-absorbing unit 32 is shown. The heat-absorbing plate 35 is a thin board having a determined length and made of good thermal conductivity materials with a black surface. The heat-absorbing plate 35 forms a fixture 352 and an opposite fastener 353 extending from two opposite lateral sides thereof along the longitudinal direction. In this embodiment, the fixture 352 is a rectangular protruding bar 352 protruding beyond top and bottom surfaces of the heat-absorbing plate 35. The fastener 353 comprises an upper plate (not labeled) located above the top surface of the heat-absorbing plate 35, and a lower plate (not labeled) parallel to the upper plate and located below the bottom surface of the heat-absorbing plate 35. The upper and lower plates of the fastener 353 cooperatively define a rectangular recess (not labeled) for receiving a corresponding fixture 352 of an adjacent heat-absorbing plate 35. A pair of fixing holes 355 are defined at front and rear edges of the heat-absorbing plate 35. Referring to FIG. 3(B), a supporting member 36 of the heat-absorbing unit 32 is shown. The supporting member 36 is made of a material easily manufactured, such as fiberglass, synthetic plastic, Polyethylene (PE) or Acrylonitrile Butadiene Styrene (ABS). The two supporting members 36 of each heat-absorbing unit 32 are mounted on two opposite transverse sides of the heat-absorbing plate 35. All the supporting members 36 of the solar collector assembly 30 evenly support the transparent panel 38 thereon. In each heat-absorbing unit 32, each supporting member 36 comprises an upper supporting member 362 located above the heat-absorbing plate 35, and a lower supporting member 366 located below the heat-absorbing plate 35. The upper supporting member 362 has a height similar to that of the heat-retention cavities 310. The lower supporting member 366 has a height similar to that of the heat-absorbing cavities 313. A pair of parallel cantilevers 364 are perpendicular to and formed between the upper and lower supporting members 362, 366. The cantilevers 364 are connected to each other at middle portions thereof via an elongated connecting portion 3640 in a manner such that a pair of parallel, elongated recesses 365 are defined. One of the recesses 365 receives the edge of the heat-absorbing plate 35 of the heat-absorbing unit 32, and the other recess 365 receives the edge of the heat-absorbing plate 35 of an adjacent heat-absorbing unit 32. Each cantilever 364 defines a pair of fixing holes 3642. The fixing holes 3642 of the pair of cantilevers 364 are provided to fix the heat-absorbing plate 35 of the heat-absorbing unit 32, and to fix the heat-absorbing plate 35 of the adjacent heat-absorbing unit 32. A pair of latching structures 3652 are formed at opposite ends of the pair of cantilevers 364, respectively. For the two supporting members 36 of each heat-absorbing unit 32, two of the latching structures 3652 at a same long side of the heat-absorbing unit 32 are for engaging with the fastener 353 of the heat-absorbing plate 35 of the heat-absorbing unit 32. In this embodiment, each latching structure 3652 comprises a pair of parallel clip boards (not labeled). A distance between the two clip boards is larger than a distance between the cantilevers 364, and larger than a distance between the upper and lower plates of the fastener 353. For each supporting member 36, a bottom seat 368 is horizontally formed on a bottom of the lower supporting member 366 and parallel to the cantilevers 364. A pair of through holes 3682 are defined in the bottom seat 368, and are located at two flanks of the lower supporting member 366.

Referring to FIG. 3 again, in assembly of the heat-absorbing unit 32, the front and rear edges of the heat-absorbing plate 35 are inserted into the corresponding recesses 365 of the two supporting members 36. Screws 42 extend through the fixing holes 3642, 355 of the supporting members 36 and the heat-absorbing plate 35 in series to engage with nuts (not labeled) in a manner such that the heat-absorbing plate 35 is mounted on the supporting members 36. Screws (not labeled) extend through the through holes 3682 to engage with the bottom plate 39 of the solar collector assembly 30.

Figure 4:
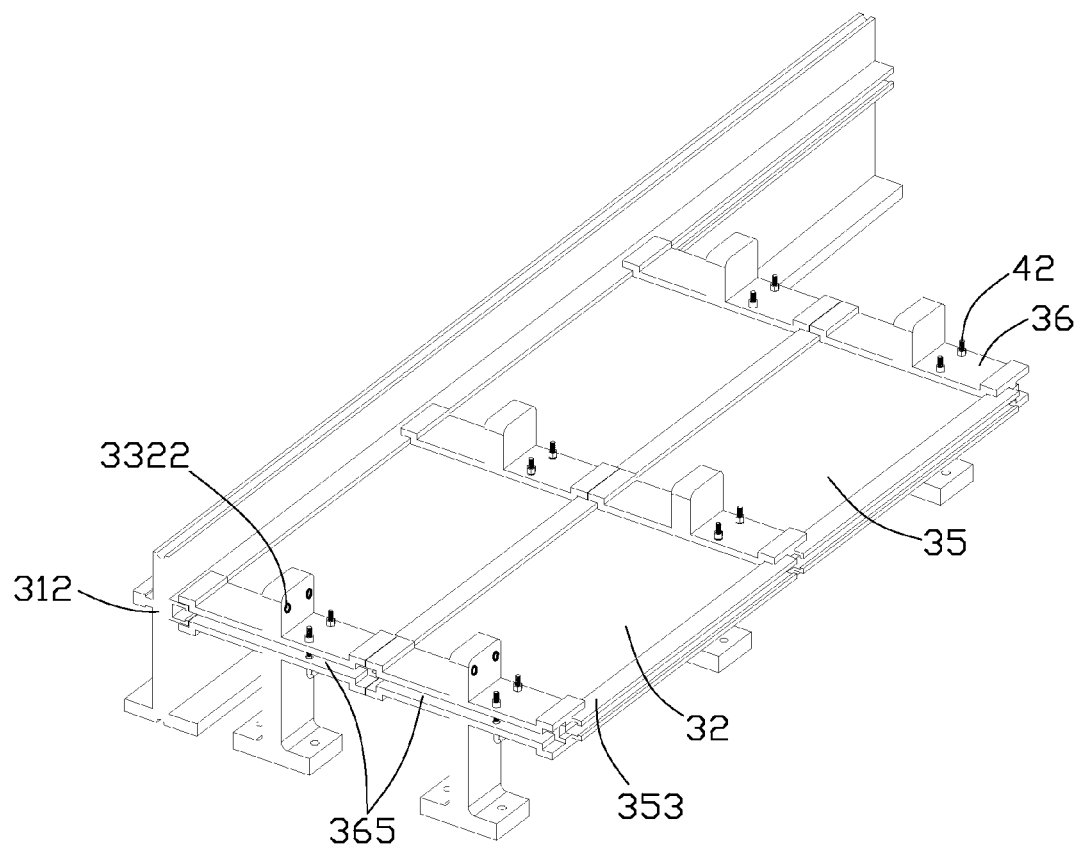
FIG. 4 is an assembled, schematic view of four of the heat-absorbing unit in FIG. 3 assembled together.
Figure 4A:
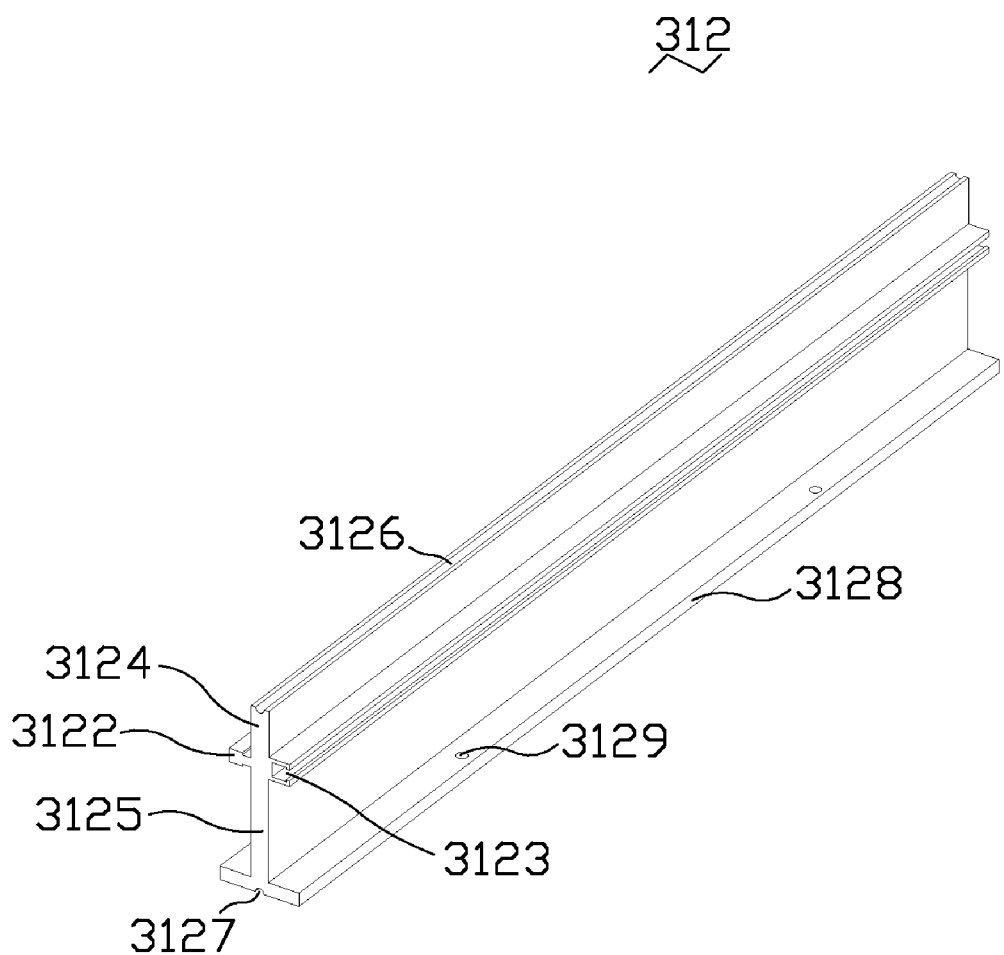
FIG. 4(A) is an schematic view of a connecting member in FIG. 4.

Referring to FIG. 4, four heat-absorbing units 32 are connected with each other in the transverse direction by means of the fastener 353 of each heat-absorbing plate 35 engaging with the protruding bar 352 of adjacent heat-absorbing plate 35, and in the longitudinal direction by means of the front and rear edge of each heat-absorbing plate 35 engaging with the corresponding recesses 365 of the supporting members 36. In order to prevent water from entering into the solar collector assembly 30, the two connecting members 312 are mounted at two opposite longitudinal sides of the solar collector assembly 30. Each connecting member 312 has a same length as a distance between the inlet assembly 10 and the outlet assembly 50. Also referring to FIG. 4A, the connecting member 312 comprises an upper connecting member 3124 located above the heat-absorbing plate 35 and a lower connecting member 3125 located below the heat-absorbing plate 35. The connecting member 312 further comprises a fixture 3122 and a fastener 3123 formed from two opposite sides of the upper connecting member 3124, and a base plate 3128 extending perpendicularly from a bottom of the lower connecting member 3125. The fixture 3122 and fastener 3123 have a similar configuration to that of the fixture 352 and the fastener 353 of the heat-absorbing plate 35, for engaging with the corresponding fastener 353 and fixture 352 of the heat-absorbing plates 35 located at two opposite longitudinal sides of the solar collector assembly 30. The lower connecting member 3125 extends upwardly from a center of the base plate 3128. In order to prevent water from entering into the solar collector assembly 30 from the two opposite sides of the transparent panel 38 and the heat-absorbing set 31 along the heat-absorbing channels 315, the connecting member 312 defines longitudinal recesses 3126, 3127 at opposite top and bottom surfaces for receiving corresponding seal gaskets 40 (shown in FIG. 5). The base plate 3128 defines a plurality of fixing holes 3129 for providing passage of screws (not shown) to fix the heat-absorbing units 32 onto the bottom plate 39 of the solar collector assembly 30.

Figure 5:
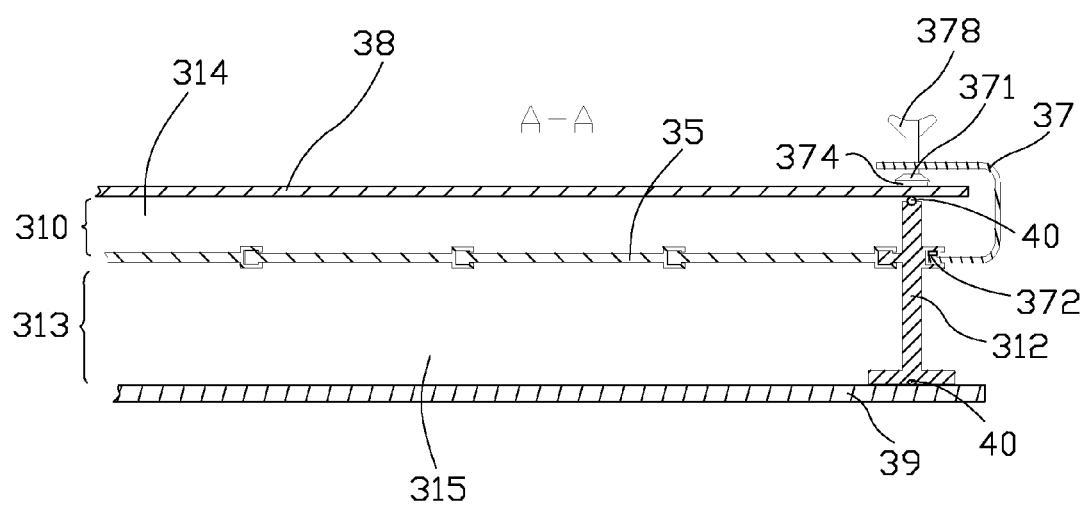
FIG. 5 is a cross-sectional view of the portion of the solar air conditioning device, taken along section A-A in FIG. 1.

Referring to FIG. 5, in order to reduce possible heat loss from the transparent panel 38, two approaches can be taken. The first approach is to close entrances and exits of the air channels 314 of the heat-retention cavities 310. The second approach is to reduce a height ratio between the upper supporting members 362 and the lower supporting members 366. Both of these approaches allow air to be heated mainly in the lower heat-absorbing channels 315. Therefore, since the solar air conditioning device 100 has only one transparent panel 38, most air goes through the lower heat-absorbing channels 315 and the device 100 demonstrates excellent heat insulation as well improving heating efficiency.

The solar collector assembly 30 further comprises a plurality of C-shaped clamps 37. For example, in the solar air conditioning device 100 with the flat transparent panel 38, the clamps 37 are used to connect the transparent panel 38 with the heat-absorbing units 32 and are fastened along two lateral sides of the solar collector assembly 30. Each C-shaped clamp 37 comprises a pressing portion 371 downwardly extending from a top end thereof and a clasp portion 372 upwardly bent from a bottom end thereof. A handle 378 corresponds to the pressing portion 371 and is used to fix the clamp 37 in place. To obtain a better effect, the clasp portions 372 of the C-shaped clamps 37 can engage with the fixture 3122 or the fastener 3123 of the connecting member 312. Moreover, the pressing portions 371 of the C-shaped clamps 370 can be first attached to a steel bar (not shown); accordingly, a soft gasket 374 should be located between the steel bar and the transparent panel 38. Thus, the transparent panel 38 can be supported more uniformly and the heat-absorbing set 31 can have better waterproofing. It should be noted that the gasket 374 can also be pre-assembled on edges of the transparent panel 38 and cover contacting surfaces between the transparent panel 38 and the pressing portions 371.

The transparent panels 38 can improve heat collection and retention of the solar air conditioning device 100 as sunshine can easily radiate through the transparent panel 38 but cannot escape through convection. Thus, solar energy can easily be absorbed by the heat-absorbing units 32 and used to heat air in the heat-absorbing channels 315; thus, the solar air conditioning device 100 has a wide surface for absorbing solar energy. The transparent panel 38 not only can have a flat-plate typed configuration but also a corrugated configuration. Material of the transparent panel 38 can be chosen from a group of glass, fiberglass, and plastic. The material of the transparent panel 38 should be transparent and weatherproof, and easily cut. It is therefore not necessary to attach the transparent panel 38 to a fixed outer frame insulation chamber (not shown) with a fixed envelop of a related solar air conditioning device (not shown). Thus, in the related solar air conditioning device, due to different coefficients of thermal expansion between the transparent panel and the fixed outer frame insulation chamber, components of the related solar air conditioning device tend to deform or break. The solar air conditioning device 100 without the fixed outer frame insulation chamber can avoid the problems described above.

The solar air conditioning device 100 can be installed horizontally or vertically attached to walls. Furthermore, it can be installed at an angle. The solar collector assembly 30 can also be fixed on a board (not shown) which is fixed to the fixed object at a distance or an angle. Beneath the bottom plate 39 of the heat-absorbing set 31, a heat-insulated layer (not shown) can be installed to prevent the roof from over-heating and reduce heat dissipation from the heat-absorbing set 31. Thus, heat in the heat-retention cavities 310 can be absorbed completely by the heat-absorbing plates 35, and then conducted to airflow in the heat-absorbing channels 315 below the heat-absorbing plates 35. Thus, a heating efficiency of the solar collector assembly 30 can be improved and thermal buoyancy of air increased.

Compared with a related solar collector assembly, the solar collector assembly 30 of the solar air conditioning device 100 including the modular heat-absorbing units 32, have many advantages, such as low packaging costs, small space required for storage and display, simple assembly and simple configuration. Moreover, the solar air conditioning device 100 can be transported easily through and assembled on site. Furthermore, the heat-absorbing units 32 can be designed or assembled according to requirements of users; thus, the solar air conditioning device 100 can be used in many different structures or houses. The solar collector assembly 30 can be extended to a big configuration easily as long as assemble more the heat-absorbing units 32, so that the solar air conditioning device 100 can have large heat-absorbing areas to collect solar energy. In addition, the heat-absorbing units 32 are suitable for mass-production so that the solar air conditioning device 100 is both cheap and high quality.

Figure 6:
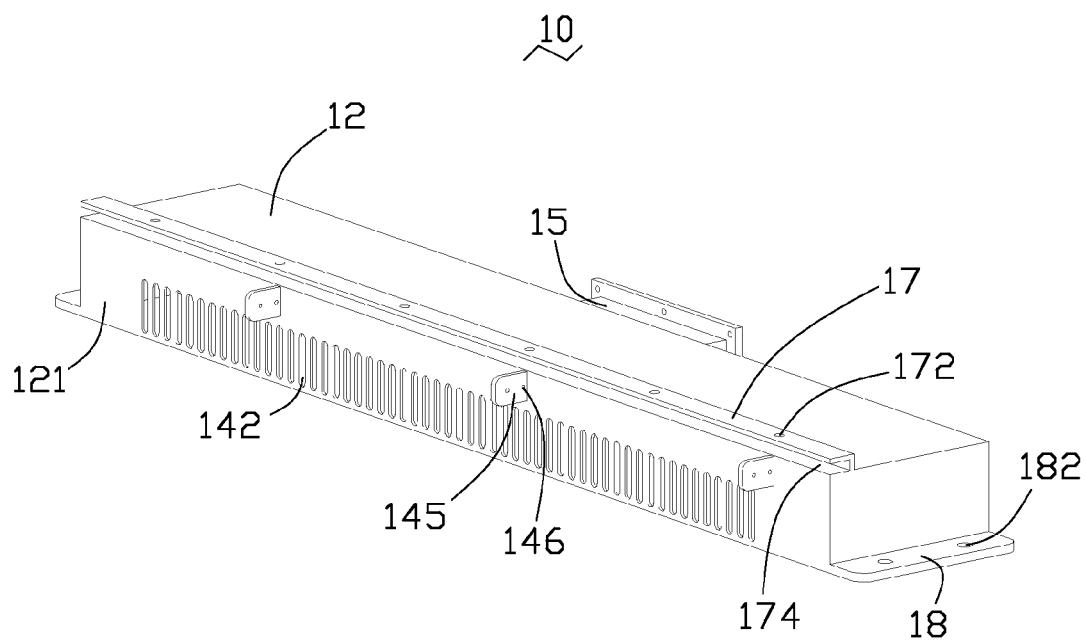
FIG. 6 is a schematic view of an inlet assembly of the solar air conditioning device in FIG. 1.
Figure 7:
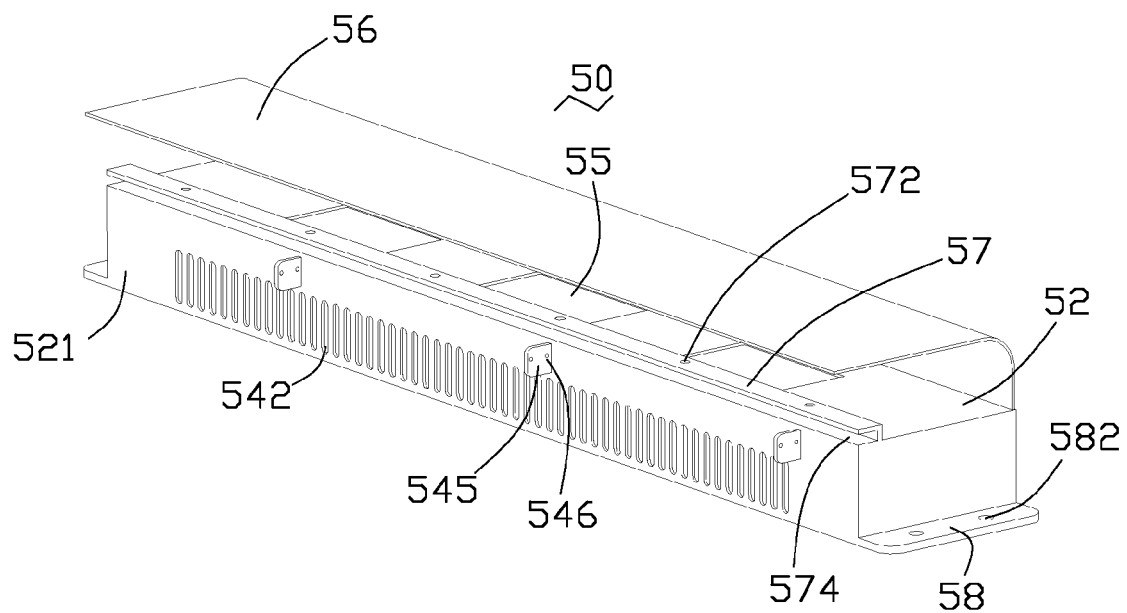
FIG. 7 is a schematic view of an outlet assembly of the solar air conditioning device in FIG. 1.

FIGS. 6 and 7 are respectively schematic views of the inlet assembly 10 and the outlet assembly 50 of the solar air conditioning device 100. As shown in FIG. 2, the inlet assembly 10 and the outlet assembly 50 are connected with an entrance (not labeled) and an exit (not labeled) of the solar air conditioning device 100 respectively, as the air channels 314 of the heat-absorbing cavities 313 of the solar collector assembly 30 communicate with the inlet assembly 10 and the outlet assembly 50. The inlet assembly 10 connects to interior exhaust pipes (not shown). Stale air from the interior can be guided into the heat-absorbing channels 315 through the inlet assembly 10, then heated in the heat-absorbing channels 315 of the solar collector assembly 30, and finally expelled to the exterior through the outlet assembly 50. Meanwhile, cool and fresh air can be guided into the interior through other channels or devices. All in all, the solar air conditioning device 100 is good for health and for saving energy.

The inlet assembly 10 has a similar configuration with the outlet assembly 50. The inlet assembly 10 comprises a hollow and rectangular casing 12. The casing 12 has a folding wall 17 extending outwardly from a top portion thereof. The folding wall 17 is near an edge of the top portion of the casing 12 and forms a rectangular groove 174 opening to a front side of the casing 12. A plurality of mounting holes 172 is defined in a top portion of the folding wall 17. The casing 12 is secured to the solar collector assembly 30 by the folding wall 17 and sealed with the transparent panel 38. The casing 12 has a partition 121 in the front side thereof. A plurality of air holes 142 is defined in a lower half portion of the partition 121. The air holes 142 are arranged at predetermined intervals. A plurality of connecting portions 145 extends perpendicularly from an upper half portion of the partition 121. The connecting portions 145 are spaced from each other. Each connecting portion 145 has two mounting holes 146 defined therein. The casing 12 is connected with the heat-absorbing set 31 by extending screws (not shown) through the mounting holes 146 of the connecting portions 145 and the upper supporting members 362 of the heat-absorbing units 32 to threadedly engage with nuts (not shown). Two connecting projections 18 extend horizontally from a bottom portion of lateral sides of the casing 12. Each of the connecting projections 18 has two mounting holes 182 defined therein. The casing 12 can be secured to a roof, a wall or a fixed board by the connecting projections 18. The casing 12 further has a hollow joint 15 in a rear side thereof. The joint 15 is used to connect to the indoor exhaust pipe. The outlet assembly 50 includes similar components to that of the inlet assembly 10, such as a casing 52, a partition 521, air holes 542, connecting portions 545, a folding wall 57, a rectangular groove 574, connecting projections 58 and mounting holes 546, 572, 582. A difference between the inlet assembly 10 and the outlet assembly 50 is that a plurality of rectangular air openings 55 is defined in a top portion of the casing 52 and a waterproof cover 56 extends outwardly from an edge of the top portion of the casing 52. Air in the casing 52 can be exchanged with the exterior through the air openings 55. The waterproof cover 56 covers the top portion of the casing 52 and is used to prevent irritants and pollutants such as, dust or mosquitoes from entering into the casing 52.

Figure 8:
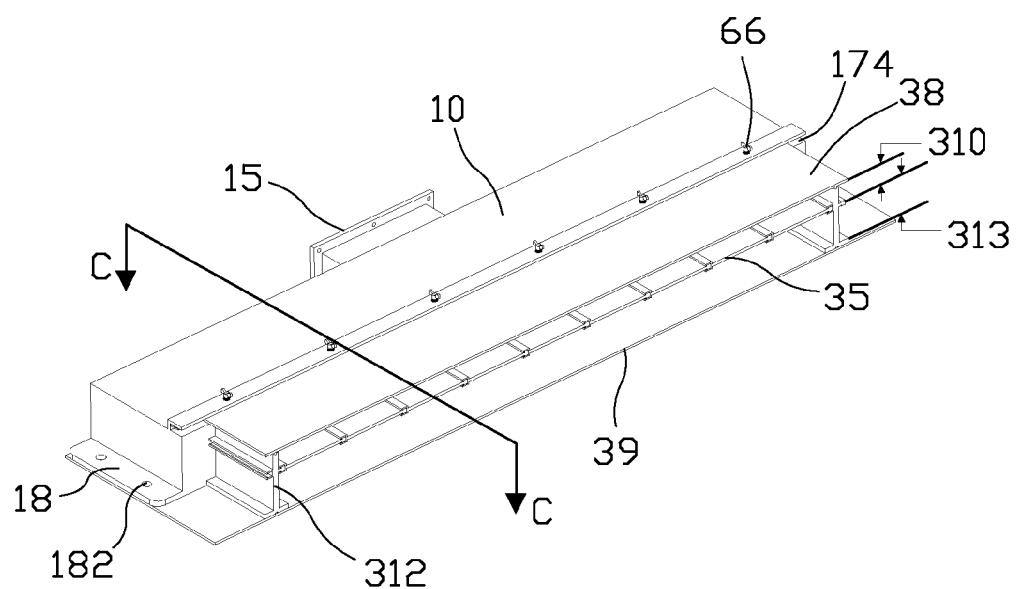
FIG. 8 is an isometric, cross-sectional view of a portion of the solar air conditioning device taken along section B-B in FIG. 1.
Figure 9:
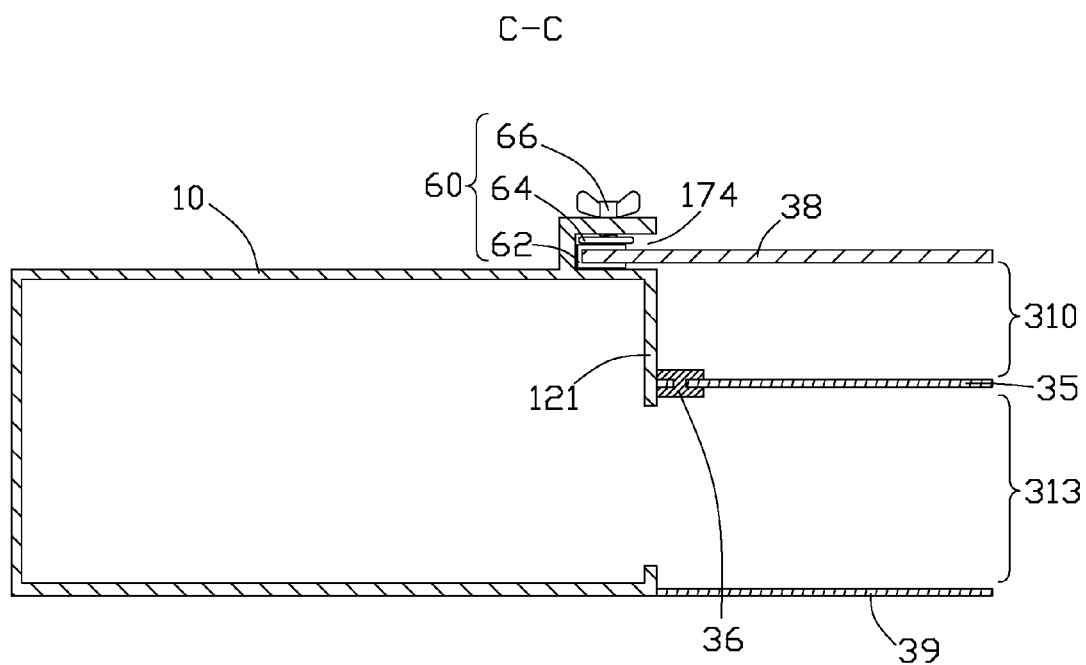
FIG. 9 is a cross-sectional view of the portion of the solar air conditioning device, taken along section C-C in FIG. 8.

FIG. 8 is a schematic view of a partial solar air conditioning device 100 cut along line B-B of the solar air conditioning device 100 of FIG. 1. FIG. 9 is a cross-sectional view of the solar air conditioning device 100, taken along line C-C of FIG. 8. The inlet assembly 10 and the outlet assembly 50 have an essentially identical waterproof configuration 60 to the transparent panel 38. For example, in the inlet assembly 10, the waterproof configuration 60 between the inlet assembly 10 and the transparent panel 38 comprises a U-shaped soft beam 62, a steel bar 64 and a plurality of screws 66. After the connecting portions 145, 545 are connected to the supporting members 36, the ends of the transparent panel 38 covered with the U-shaped soft beams 62 are respectively inserted into the rectangular grooves 174, 574; then, the steel bar 64 is inserted into space between the upper portion of the rectangular grooves 174, 574 and the U-shaped soft beams 62; then, the screws 66 are inserted through the mounting holes 172 of the folding wall 17 to abut against the steel bar 64 so that the U-shaped soft beams 62 together with the end of the transparent panel 38 are securely attached in the rectangular groove 174. Thus, the waterproof configuration 60 between the inlet assembly 10 and the transparent panel 38 is formed. The waterproof configuration 60 between the outlet assembly 50 and the transparent panel 38 can be attained in a similar way.

Figure 10:
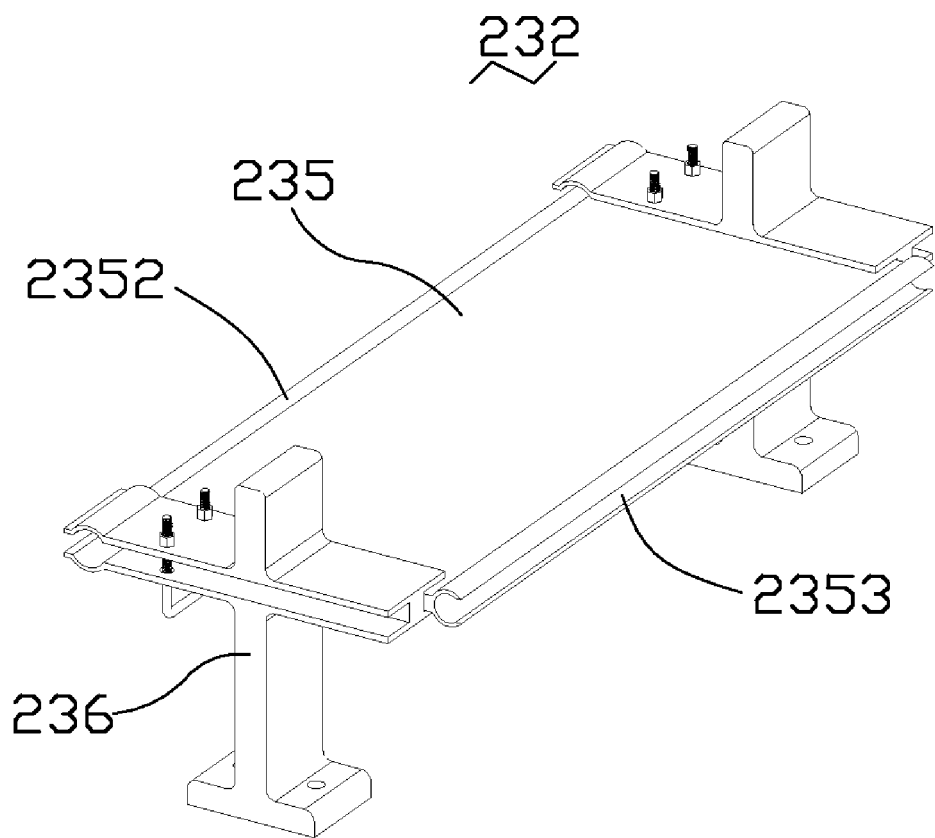
FIG. 10 is a schematic view of a heat-absorbing unit in accordance with a second embodiment of the present invention.
Figure 10A:
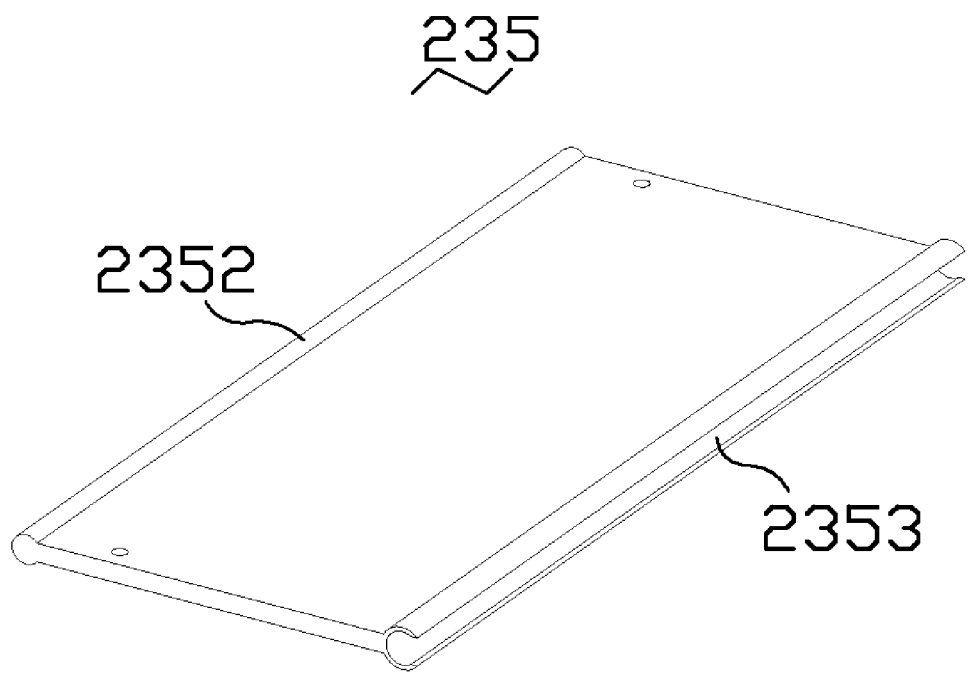
FIG. 10(A) is a schematic view of a heat-absorbing plate in FIG. 10.
Figure 10B:
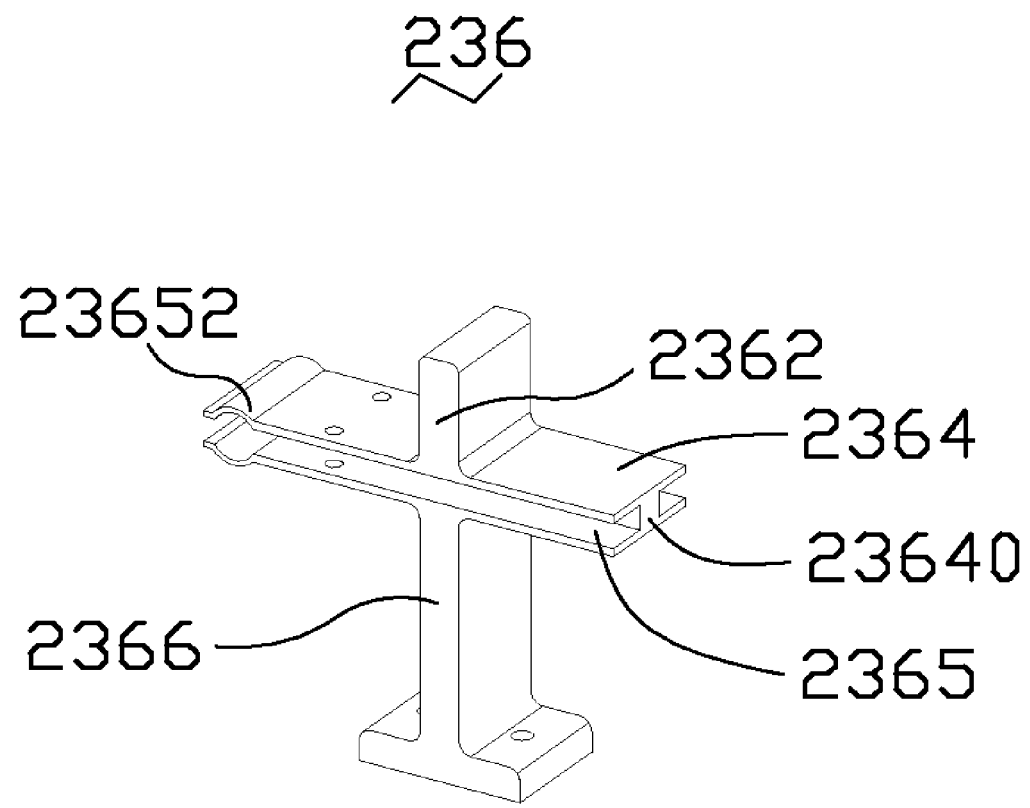
FIG. 10(B) is a schematic view of a supporting member of FIG. 10.
Figure 10C:
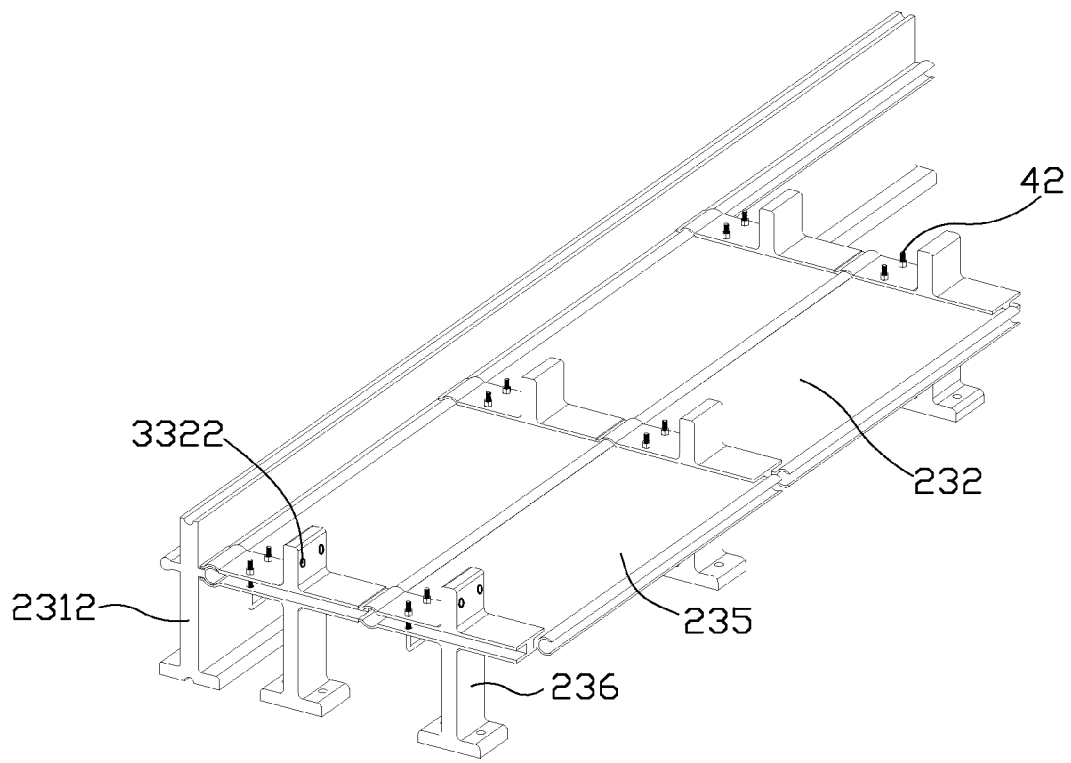
FIG. 10(C) is an assembled, schematic view of four of the heat-absorbing unit in FIG. 10 assembled together.
Figure 10D:
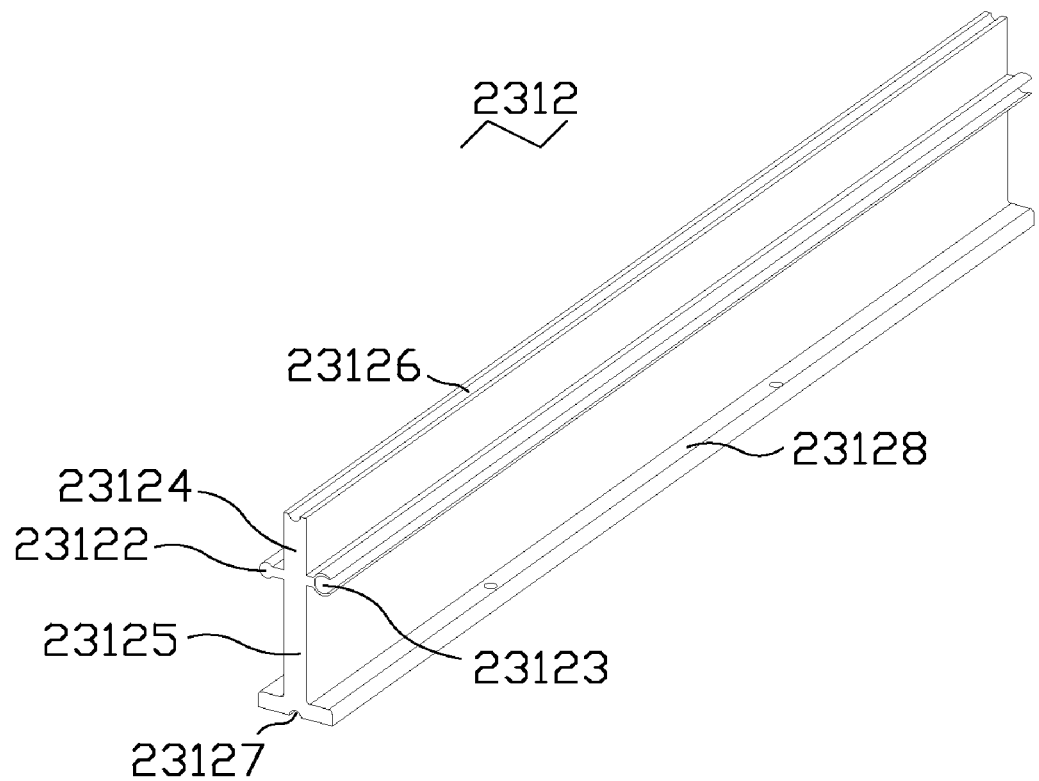
FIG. 10(D) is an schematic view of a connecting member in FIG. 10(C)

Referring to FIGS. 10, 10(A) and 10(B), a heat-absorbing unit 232 in accordance with a second embodiment of the present invention is shown. The heat-absorbing unit 232 being similar to the heat-absorbing unit 32 of the first embodiment, comprises a pair of supporting members 236 and a heat-absorbing plate 235 mounted between the two supporting members 236. Each supporting member 236 form a fixture 2352 similar to the fixture 352 of the first embodiment and a fastener 2353 similar to the fasteners 353 of the first embodiment. The fixture 2352 and the fastener 2353 each have a round cross section. The supporting member 236 comprises an upper supporting member 2362 located above the heat-absorbing plate 235 and a lower supporting member 2366 located below the heat-absorbing plate 235. A pair of parallel cantilevers 2364 are perpendicular to and formed between the upper and lower supporting members 2362, 2366. The cantilevers 364 extend horizontally and transversely from the supporting member 236. The cantilevers 2364 are connected each other at middle portion thereof via a connecting portion 23640 in a manner such that a pair of opposite recesses 2365 are defined to receive front and rear edges of the heat-absorbing plate 235. A latching structure 23652 are formed at a free end of the cantilevers 364 for engaging with the fasteners 2353 of the heat-absorbing plate 235. The latching structure 23652 consists of two opposite arced plates (not labeled) bent from ends of the cantilevers 364. FIG. 10(C) is an assembled, schematic view of four heat-absorbing units 232 assembled together. A pair of connecting members 2312 are mounted at two opposite longitudinal sides of the heat-absorbing units 232. Each connecting member 2312 has a same length as a distance between the inlet assembly 10 and the outlet assembly 50. Also referring to FIG. 10(D), the connecting member 2312 has a similar configuration to that of the connecting member 312 of the first embodiment. The connecting member 2312 comprises an upper connecting member 23124 located above the heat-absorbing plate 235 and a lower connecting member 23125 located below the heat-absorbing plate 235. The connecting member 2312 further comprises a fixture 23122 and a fastener 23123 formed from two opposite sides of the upper connecting member 23124, and a base plate 23128 extending perpendicularly from a bottom of the lower connecting member 23125. The fixture 23122 and the fastener 23123 each have a round cross section. The connecting member 2312 defines longitudinal recesses 23126, 23127 at opposite top and bottom surfaces for receiving corresponding seal gaskets (not shown). The fastener 23123 of one of the connecting members 2312 engages with the corresponding fixture 2352 of corresponding heat-absorbing plate 235 and the fixture 23122 of another connecting member 2312 engages with the fastener 2353 of corresponding heat-absorbing plate 235.

Figure 11:
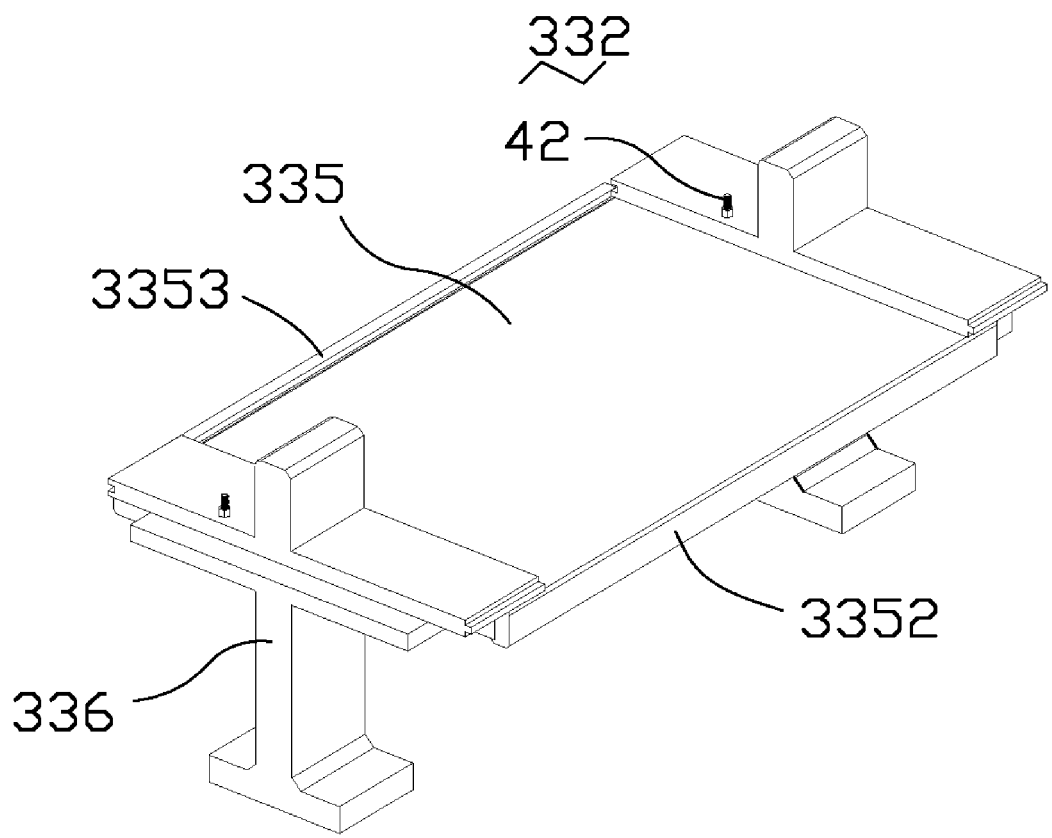
FIG. 11 is a schematic view of a heat-absorbing unit in accordance with a third embodiment of the present invention.
Figure 11A:
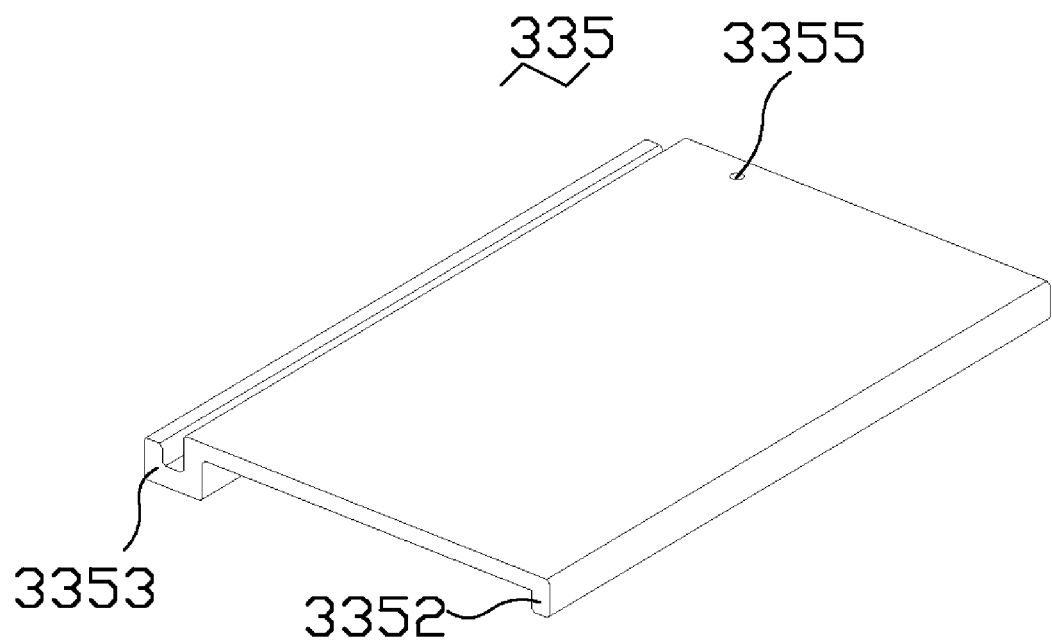
FIG. 11(A) is a schematic view of a heat-absorbing plate in FIG. 11.
Figure 11B:
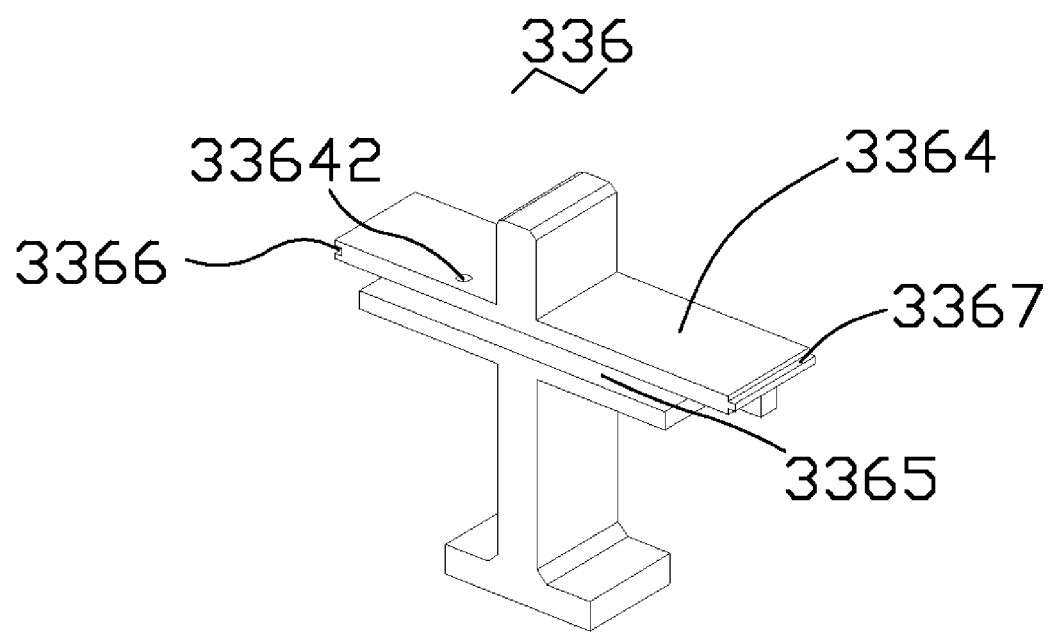
FIG. 11(B) is a schematic view of a supporting member of FIG. 11.
Figure 11C:
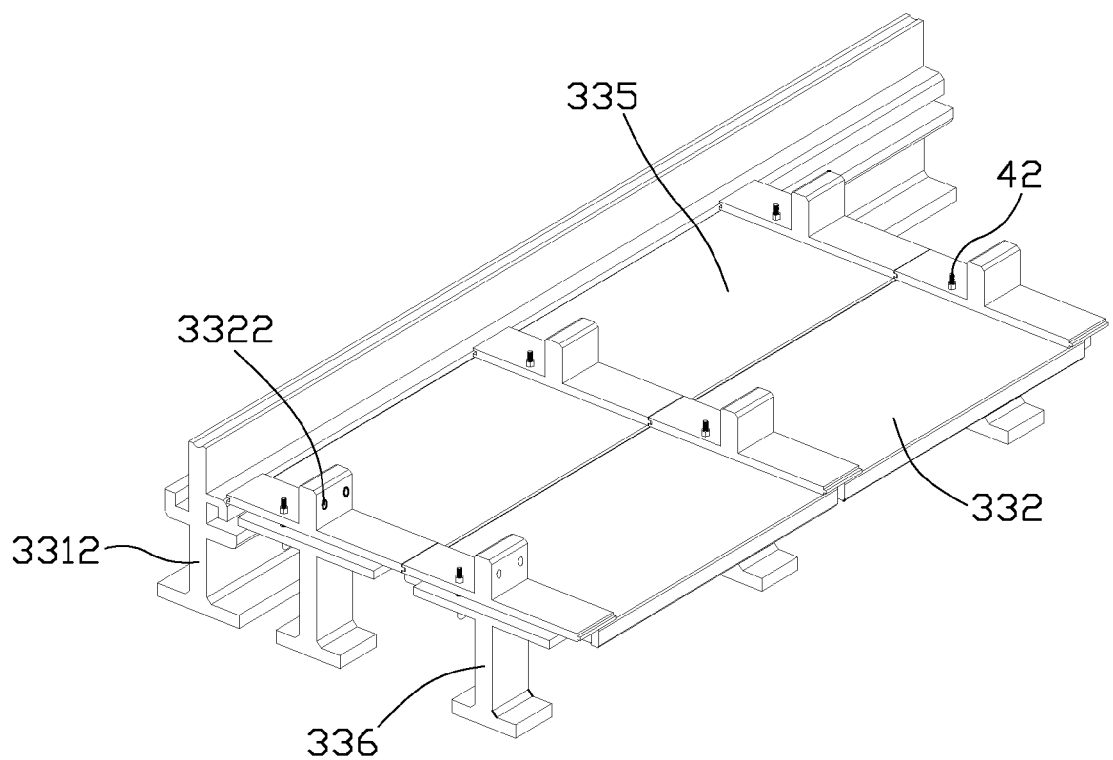
FIG. 11(C) is an assembled, schematic view of four of the heat-absorbing unit in FIG. 11 assembled together.
Figure 11D:
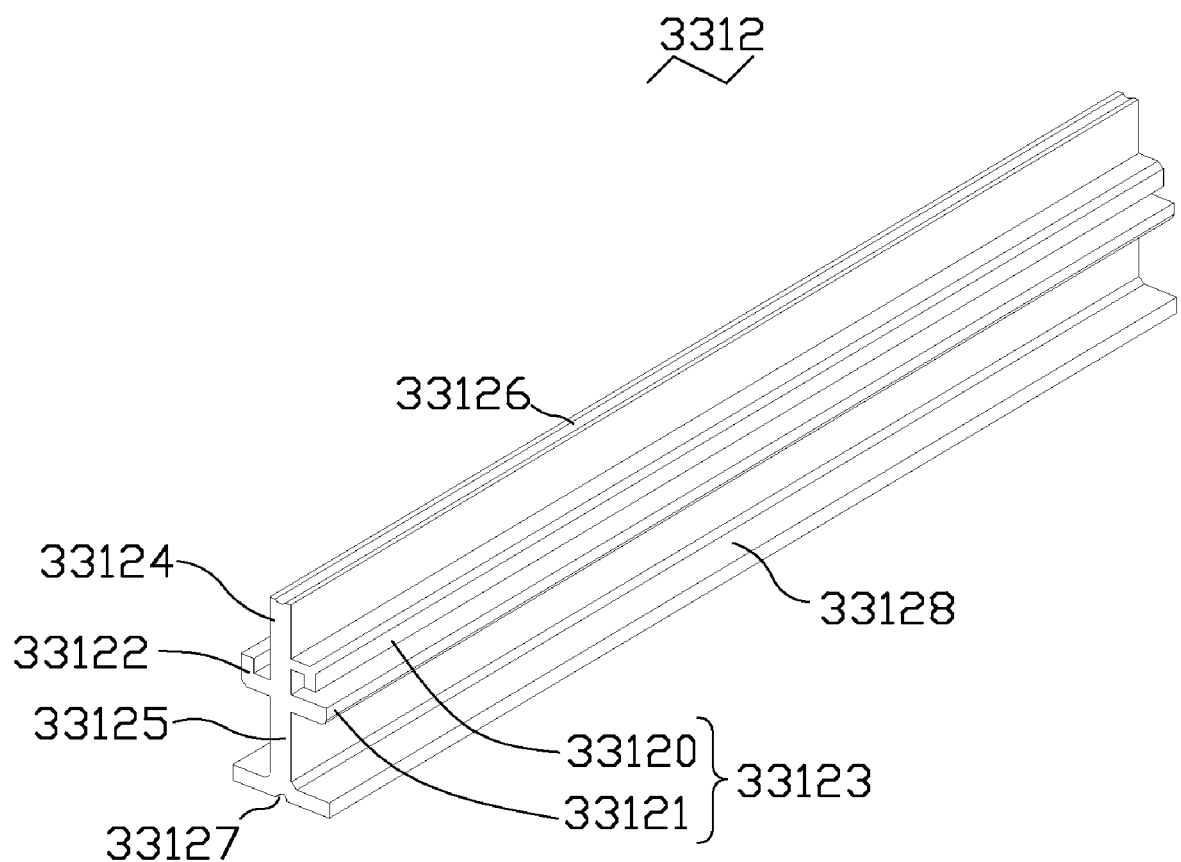
FIG. 11(D) is an schematic view of a connecting member in FIG. 11(C).

Referring to FIG. 11, a heat-absorbing unit 332 in accordance with a third embodiment of the present invention is shown. The heat-absorbing unit 332 being similar to the heat-absorbing unit 32 of the first embodiment, comprises a pair of supporting members 336 and a heat-absorbing plate 335 mounted between the two supporting members 336. Referring to FIG. 11(A), the heat-absorbing plate 335 forms a fixture 3352 perpendicularly bent from a longitudinal side thereof and a fastener 3353 bent from another opposite longitudinal side thereof. The fixture 3352 is an elongated flange. The fastener 3353 has a U-shaped cross section to define a U shaped recess (not labeled) to receiving the fixture 3352 of adjacent heat-absorbing plate 335. Referring to FIG. 11(B), the supporting member 336 is similar to the supporting member 36 of the first embodiment. The supporting member 336 has upper and lower cantilevers 3364. The upper cantilever 3364 is longer than the lower cantilever 3364. The cantilevers 3364 are connected each other at middle portion thereof in a manner such that a pair of opposite recesses 3365 are defined to receive front and rear edges of the heat-absorbing plate 335. A fixture 3366 and a fastener 3367 are formed at two opposite ends of the upper cantilever 3364. The fixture 3366 is a recess and the fastener 3367 is a protruding bar 3367 to be engaged in the recess of adjacent supporting member 336. FIG. 11(C) is an assembled, schematic view of four heat-absorbing units 332 assembled together. A pair of connecting members 3312 are mounted at two opposite longitudinal sides of the heat-absorbing units 332. Each connecting member 3312 has a same length as a distance between the inlet assembly 10 and the outlet assembly 50. Also referring to FIG. 11(D), the connecting member 3312 has a similar configuration to that of the connecting member 312 of the first embodiment. The connecting member 3312 comprises an upper connecting member 33124 located above the heat-absorbing plate 335 and a lower connecting member 33125 located below the heat-absorbing plate 335. The connecting member 3312 further comprises a fastener 33122 and a fixture 33123 formed from two opposite sides of the upper connecting member 23124, and a base plate 33128 extending perpendicularly from a bottom of the lower connecting member 33125. The fastener 31222 is upwardly bent from a lateral side of the upper connecting member 33125 to form an L-shaped configuration. The fixture 33123 comprises a positioning portion 33120 downwardly bent from another opposite lateral side of the upper connecting member 33125 to form an invert L-shaped configuration, and a supporting board 33121. The connecting member 3312 defines longitudinal recesses 33126, 33127 at opposite top and bottom surfaces for receiving corresponding seal gaskets (not shown). The fastener 33122 of one of the connecting members 3312 engages with the corresponding fixture 3352 of corresponding heat-absorbing plate 235 and the fixture 23123 of another connecting member 3312 engages with the fastener 3353 of corresponding heat-absorbing plate 235.

In summer, the solar air conditioning device 100 can heat stale air guided from the interior exhaust pipes connecting with a room (not shown) and expel the heated stale air out of the room using thermal buoyancy. At the same time, cool and fresh air from the exterior can be guided into the room, or air from the exterior can be cooled and guided into the room through other devices (not shown) or channels (not shown). Thus, in summer, air in the room can be kept fresh and cool all the time.

In winter, air through the interior exhaust pipes can be heated in the solar collector assembly 30 of the solar air conditioning device 100 and guided to the room via a fan (not shown) connected with the interior exhaust pipes. Furthermore, when fresh air from the exterior is guided to mix with air in the interior exhaust pipes and further heated in the solar collector assembly 30, the inlet assembly 10 should communicate with the interior exhaust pipes and the air openings 55 of the casing 52 should be opened. The fan draws the fresh air through the solar air conditioning device 100 to the indoor room.

The solar air conditioning device 100 can be installed with a hot water supply system (not shown) which can operate year-round. A plurality of heat-absorbing water pipes (not shown) are arranged in the heat-retention cavities 310 of the solar air conditioning device 100, then heated water is transferred back to a water circulation circuit (not shown) including a heat storage tank (not shown). Meanwhile, air is heated in the heat-absorbing channels 315 of the solar air conditioning device 100.

The solar air conditioning device 100 in accordance with the present invention has many features that are superior to the related solar air conditioning devices. With its modular design, the solar air conditioning device 100 provides users with greater compatibility in application as well as more selection and freedom in assembly. The solar air conditioning device 100 can be installed in all kinds of structures and vehicles, including ones that are under construction or currently existing ones. The solar air conditioning device 100 can be installed horizontally or vertically attached to walls. Furthermore, it can be installed at an angle. The solar air conditioning device 100 can also provide excellent heat insulation and protection to the structure.

The heat-absorbing units 32, 232, 332 used in the solar air conditioning device 100 can be flexibly expanded as desired to the most optimal absorption surface area to fully absorb and collect heat energy. Therefore, the solar air conditioning device 100 does not need a fixed outer frame insulation chamber like the one used in the related solar air conditioning assembly. The solar air conditioning device 100 also needs no special consideration for the heat efficiency of each individual unit, as the related models do. One special feature of the solar air conditioning device 100 is that although it only has one layer of transparent panel in its structure, because most air goes through the lower heat-absorbing channels 315, the solar air conditioning device 100 has the excellent insulation effect of a double-glazed system and very high heat-absorption efficiency.

Compared with the related models, the solar air conditioning device 100 has a lighter and thinner structure and appearance, and thus it does not cause an overly heavy load to structures. The commercially available flat transparent panel 38 and corrugated transparent panel 38a can maintain the harmony and aesthetics of the existing structures. Furthermore, since the installation of the transparent panels 38, 38a does not have to be glazed into the outer frame of the heat-insulated chamber as one must in the related model, the thermal expansion coefficient of materials used in the solar air conditioning device 100 will not cause thermal stress problems related to deformation or cracking.

The solar air conditioning device 100 is designed according to a modular concept. Cost of the solar air conditioning device 100 is greatly reduced because the heat-absorbing units 32, 232, 332 are made of thin boards and plates. The solar air conditioning device 100 is much simpler than related assemblies with whole-unit designs. The assembly not only saves expenses in packaging but also requires less room for display and storage to make channel marketing much easier. The solar air conditioning device 100 is very easy to install and maintain such a system. Moreover, users can install and assemble the system by themselves.

What is claimed is:

1. A solar air conditioning device comprising:
   a solar collector assembly, comprising:
      a heat-absorbing set comprising a plurality of heat-absorbing units, the heat-absorbing units engaging with each other, each of the heat-absorbing units comprising two adjacent supporting members and a heat-absorbing plate sandwiched between and engaging with the two adjacent supporting members, each supporting member in a middle area of the plurality of heat-absorbing units being shared by two adjacent heat-absorbing units, a pair of opposite connecting members mounted at two outmost and opposite longitudinal sides of the plurality of heat-absorbing units, the connecting members engaging with corresponding heat-absorbing plates of the plurality of heat-absorbing units; and
      a transparent panel assembled to a top of the heat-absorbing set, an air channel defined between the transparent panel and the heat-absorbing set, and a heat-absorbing channel defined below the air channel and hermetically isolated from the air channel;
   an inlet assembly installed at an entrance of the solar collector assembly; and
   an outlet assembly installed at an exit of the solar collector assembly, wherein the inlet and outlet assemblies communicate with opposite ends of the heat-absorbing channel, respectively, whereby air can flow from the inlet assembly to the outlet assembly via the heat-absorbing channel and vice versa;
   wherein in a longitudinal direction, a distance between the inlet assembly and the outlet assembly is equal to a longitudinal length of the connecting members;
   wherein each of the supporting members in the middle area of the plurality of heat-absorbing units comprises:
      an upper supporting member located above the heat-absorbing plate of the corresponding heat-absorbing unit;
      a lower supporting member located below the heat-absorbing plate of the corresponding heat-absorbing unit;
      a pair of parallel cantilevers between and substantially perpendicular to the upper and lower supporting members;
      a connecting portion connecting the pair of cantilevers to each other at middle portions thereof; and
      a pair of first recesses at two opposite sides of the connecting portion, the first recesses being between the pair of cantilevers; and
   wherein for each supporting member in the middle area of the plurality of heat-absorbing units, one of the first recesses receives an edge of the heat-absorbing plate of the corresponding heat-absorbing unit, and the other first recess receives an edge of the heat-absorbing plate of the adjacent heat-absorbing unit.

2. The solar air conditioning device as claimed in claim 1, wherein each heat-absorbing plate forms a fixture and an opposite fastener, the fixture and the fastener extending along two longitudinal sides of the heat-absorbing plate, and for each heat-absorbing plate in a major area of the plurality of heat-absorbing units, the fixture of each heat-absorbing plate engages with the fastener of a corresponding adjacent heat-absorbing plate.

3. The solar air conditioning device as claimed in claim 2, wherein the fixture is a protruding bar protruding beyond both a top surface and a bottom surface of the heat-absorbing plate, and the fastener comprises an upper plate located above the top surface of the heat-absorbing plate and a lower plate parallel to the upper plate and located below the bottom surface of the heat-absorbing plate in a manner such that a second recess is defined by the upper and lower plates of the fastener for receiving the fixture of the corresponding adjacent heat-absorbing plate.

4. The solar air conditioning device as claimed in claim 3, wherein the fixture and the second recess of each heat-absorbing plate each have a rectangular cross section.

5. The solar air conditioning device as claimed in claim 3, wherein the fixture and the second recess of each heat-absorbing plate each have a round cross section.

6. The solar air conditioning device as claimed in claim 2, wherein the fixture is an elongated flange perpendicularly bent from one of the longitudinal sides of the heat-absorbing plate, and the fastener is bent from the other longitudinal side of the heat-absorbing plate to form the second recess as a U-shaped recess for receiving the fixture of the corresponding adjacent heat-absorbing plate.

7. The solar air conditioning device as claimed in claim 6, wherein each of the connecting members comprises a fixture and a fastener formed from two opposite sides thereof, the fixture of one of the connecting members engaging with the fasteners of the heat-absorbing plates located at one of two opposite longitudinal sides of the solar collector assembly, and the fastener of the other connecting member engaging with the fixtures of the heat-absorbing plates located at the other of the two opposite longitudinal sides of the solar collector assembly.

8. The solar air conditioning device as claimed in claim 1, wherein fixing holes are respectively defined in the cantilevers of the supporting members and the heat-absorbing plates for providing passage of screws to fix the heat-absorbing plates onto the cantilevers.

9. The solar air conditioning device as claimed in claim 1, wherein a latching structure is formed at free ends of the pair of the cantilevers of each supporting member, the free ends being located at the same side of the supporting member, and the latching structure is configured for engaging with the fastener of an adjacent heat-absorbing plate.

10. The solar air conditioning device as claimed in claim 2, wherein each of the connecting members comprises a fixture and a fastener formed from two opposite sides thereof, the fixture of one of the connecting members engaging with the fasteners of the heat-absorbing plates located at one of two opposite longitudinal sides of the solar collector assembly, and the fastener of the other connecting member engaging with the fixtures of the heat-absorbing plates located at the other of the two opposite longitudinal sides of the solar collector assembly.

11. The solar air conditioning device as claimed in claim 10, wherein each of the connecting members further comprises an upper connecting member located above the corresponding adjacent heat-absorbing plates and a lower connecting member located below the corresponding adjacent heat-absorbing plates.

12. The solar air conditioning device as claimed in claim 1, wherein in each of the supporting members, the connecting portion is elongated, and the first recesses are elongated.

13. A solar air conditioning device comprising:
a solar collector assembly, comprising:
a heat-absorbing set comprising a plurality of heat-absorbing units, the heat-absorbing units engaging with each other, each of the heat-absorbing units comprising two adjacent supporting members and a heat-absorbing plate sandwiched between and engaging with the two adjacent supporting members, a pair of opposite connecting members mounted at two outmost and opposite longitudinal sides of the heat-absorbing units, the connecting members engaging with corresponding heat-absorbing plates of the heat-absorbing units; and
a transparent panel assembled to a top of the heat-absorbing set, an air channel defined between the transparent panel and the heat-absorbing set, and a heat-absorbing channel defined below the air channel and hermetically isolated from the air channel;
an inlet assembly installed at an entrance of the solar collector assembly; and
an outlet assembly installed at an exit of the solar collector assembly, wherein the inlet and outlet assemblies communicate with opposite ends of the heat-absorbing channel, respectively, whereby air can flow from the inlet assembly to the outlet assembly via the heat-absorbing channel and vice versa;
wherein in a longitudinal direction, a distance between the inlet assembly and the outlet assembly is equal to a longitudinal length of the connecting members;
wherein the heat-absorbing plate of each heat-absorbing unit forms a fixture and an opposite fastener, the fixture and the fastener extending along two longitudinal sides of the heat-absorbing plate, the fixture of the heat-absorbing plate configured for engaging with the fastener of an adjacent heat-absorbing plate;
wherein the fixture is an elongated flange perpendicularly bent from one longitudinal side of the heat-absorbing plate, and the fastener is bent from the other longitudinal side of the heat-absorbing plate to form a U-shaped recess configured for receiving the fixture of an adjacent heat-absorbing plate;
wherein each of the connecting members comprises a fixture and a fastener formed from two opposite sides thereof, the fixture of one of the connecting members engaging with the fasteners of the heat-absorbing plates located at one of two opposite longitudinal sides of the solar collector assembly, and the fastener of the other connecting member engaging with the fixtures of the heat-absorbing plates located at the other of the two opposite longitudinal sides of the solar collector assembly;
wherein each of the supporting members comprises an upper supporting member located above the heat-absorbing plate and a lower supporting member located below the heat-absorbing plate, and a pair of parallel cantilevers formed between the upper and lower supporting members and being substantially perpendicular to the upper and lower supporting members; and
wherein fixing holes are respectively defined in the cantilevers and the heat-absorbing plates for providing passage of screws to fix the heat-absorbing plates onto the cantilevers.

14. A solar air conditioning device comprising:
a solar collector assembly, comprising:
a heat-absorbing set comprising a plurality of heat-absorbing units, the heat-absorbing units engaging with each other, each of the heat-absorbing units comprising two adjacent supporting members and a heat-absorbing plate sandwiched between and engaging with the two adjacent supporting members, a pair of opposite connecting members mounted at two outmost and opposite longitudinal sides of the heat-absorbing units, the connecting members engaging with corresponding heat-absorbing plates of the heat-absorbing units; and a transparent panel assembled to a top of the heat-absorbing set, an air channel defined between the transparent panel and the heat-absorbing set, and a heat-absorbing channel defined below the air channel and hermetically isolated from the air channel;

an inlet assembly installed at an entrance of the solar collector assembly; and an outlet assembly installed at an exit of the solar collector assembly, wherein the inlet and outlet assemblies communicate with opposite ends of the heat-absorbing channel, respectively, whereby air can flow from the inlet assembly to the outlet assembly via the heat-absorbing channel and vice versa;

wherein in a longitudinal direction, a distance between the inlet assembly and the outlet assembly is equal to a longitudinal length of the connecting members;

wherein the heat-absorbing plate of each heat-absorbing unit forms a fixture and an opposite fastener, the fixture and the fastener extending along two longitudinal sides of the heat-absorbing plate, the fixture of the heat-absorbing plate configured for engaging with the fastener of an adjacent heat-absorbing plate;

wherein the fixture is an elongated flange perpendicularly bent from one longitudinal side of the heat-absorbing plate, and the fastener is bent from the other longitudinal side of the heat-absorbing plate to form a U-shaped recess configured for receiving the fixture of an adjacent heat-absorbing plate;

wherein each of the connecting members comprises a fixture and a fastener formed from two opposite sides thereof, the fixture of one of the connecting members engaging with the fasteners of the heat-absorbing plates located at one of two opposite longitudinal sides of the solar collector assembly, and the fastener of the other connecting member engaging with the fixtures of the heat-absorbing plates located at the other of the two opposite longitudinal sides of the solar collector assembly;

wherein each of the supporting members comprises an upper supporting member located above the heat-absorbing plate and a lower supporting member located below the heat-absorbing plate, and a pair of parallel cantilevers formed between the upper and lower supporting members and being substantially perpendicular to the upper and lower supporting members; and wherein a latching structure is formed at free ends of the pair of the cantilevers, the free ends are located at the same side of the supporting member, and the latching structure is configured for engaging with the fastener of the adjacent heat-absorbing plate.

* * * * *